United States Patent
Cashler et al.

(10) Patent No.: US 10,393,862 B2
(45) Date of Patent: Aug. 27, 2019

(54) TRAILER ESTIMATION WITH ELEVATION ENHANCED SENSING

(71) Applicant: APTIV TECHNOLOGIES LIMITED, St. Michael (BB)

(72) Inventors: Robert J. Cashler, Kokomo, IN (US); Premchand Krishna Prasad, Carmel, IN (US)

(73) Assignee: APTIV TECHNOLOGIES LIMITED (BB)

(*) Notice: Subject to any disclaimer, the term of this patent is extended or adjusted under 35 U.S.C. 154(b) by 301 days.

(21) Appl. No.: 15/204,071

(22) Filed: Jul. 7, 2016

(65) Prior Publication Data

US 2018/0011172 A1    Jan. 11, 2018

(51) Int. Cl.
| | |
|---|---|
| *G01S 7/41* | (2006.01) |
| *G01S 13/04* | (2006.01) |
| *G01S 13/72* | (2006.01) |
| *G01S 13/42* | (2006.01) |
| *G01S 13/87* | (2006.01) |
| *G01S 13/93* | (2006.01) |

(52) U.S. Cl.
CPC ............... *G01S 7/411* (2013.01); *G01S 7/412* (2013.01); *G01S 13/04* (2013.01); *G01S 13/42* (2013.01); *G01S 13/72* (2013.01); *G01S 13/878* (2013.01); *G01S 13/931* (2013.01); *G01S 2013/9332* (2013.01); *G01S 2013/9378* (2013.01)

(58) Field of Classification Search
CPC ...... G01S 7/411; G01S 13/931; G01S 13/878; G01S 7/412; G01S 13/72; G01S 13/04; G01S 13/42; G01S 2013/9378; G01S 2013/9332
USPC .......................................................... 342/146
See application file for complete search history.

(56) References Cited

U.S. PATENT DOCUMENTS

| | | | |
|---|---|---|---|
| 5,361,072 A * | 11/1994 | Barrick ..................... | G01S 7/35 342/133 |
| 9,211,889 B1 | 12/2015 | Hoetzer et al. | |
| 2010/0109938 A1* | 5/2010 | Oswald ................. | G01S 7/2926 342/90 |
| 2013/0176161 A1* | 7/2013 | Derham .................... | G01S 7/36 342/27 |
| 2016/0041258 A1 | 2/2016 | Cashier et al. | |
| 2016/0153778 A1 | 6/2016 | Singh et al. | |

FOREIGN PATENT DOCUMENTS

| | | |
|---|---|---|
| DE | 10 2005 042 729 A1 | 3/2007 |
| DE | 10 2006 028625 A1 | 10/2007 |
| DE | 10 2014 107917 A1 | 9/2015 |
| GB | 2 518 857 A | 4/2015 |

* cited by examiner

*Primary Examiner* — Frank J McGue
(74) *Attorney, Agent, or Firm* — Joseph Victor Bonadies

(57) ABSTRACT

A trailer-detection system includes a radar-sensor and a controller. The radar-sensor is used to determine a range, an azimuth-angle, and an elevation-angle of a radar-signal reflected by a trailer towed by a host-vehicle. The controller is in communication with the radar-sensor. The controller is configured to determine a size of the trailer towed by the host-vehicle based on the range, the azimuth-angle, and the elevation-angle of the radar-signal.

19 Claims, 4 Drawing Sheets

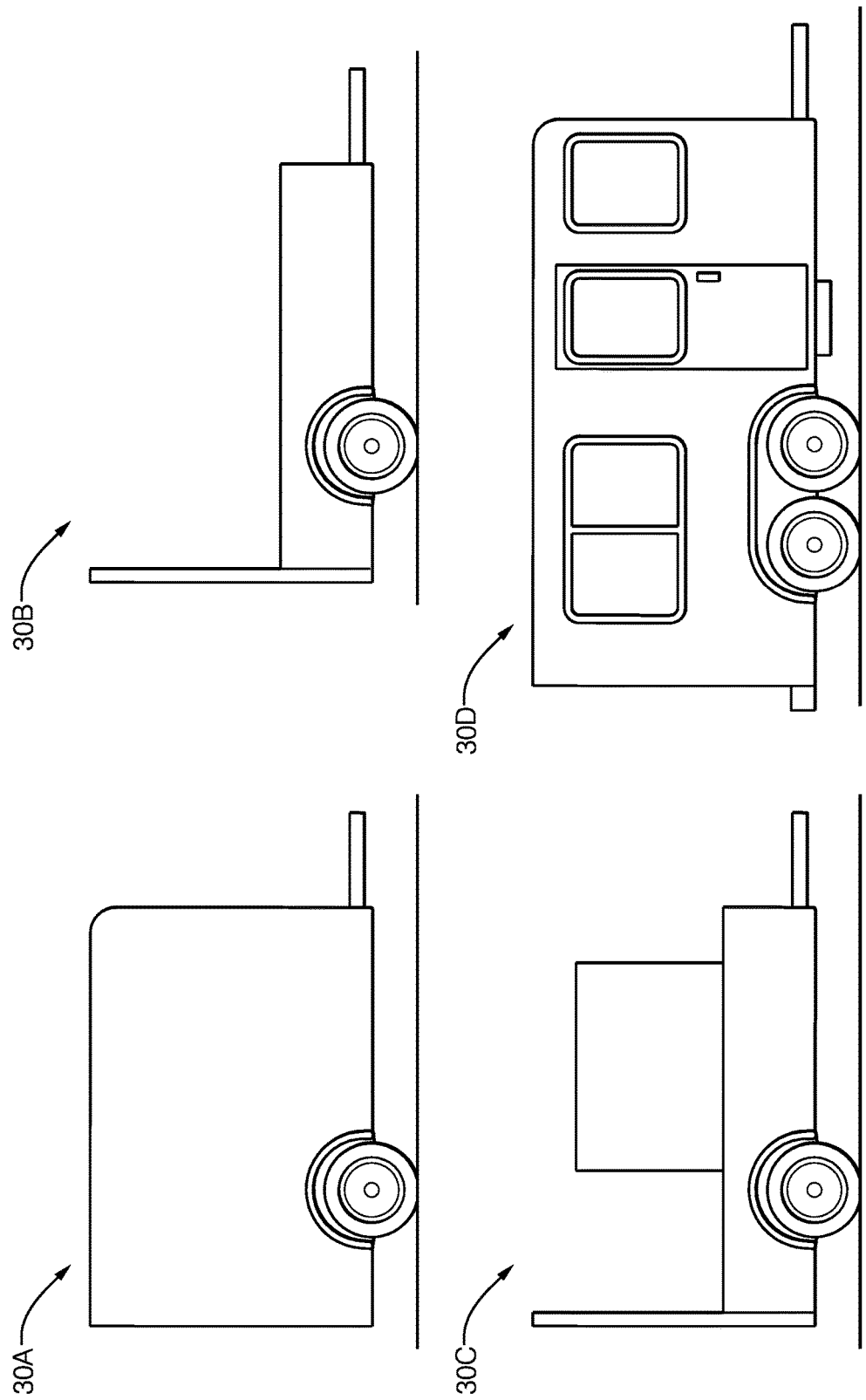

TRAILER ESTIMATION WITH ELEVATION ENHANCED SENSING

TECHNICAL FIELD OF INVENTION

This disclosure generally relates to a vehicle radar-system, and more particularly relates to a system that detects a trailer-presence and determines a trailer-size and a trailer-type.

BACKGROUND OF INVENTION

It is known to equip a host-vehicle with a radar system for detecting objects such as other vehicles proximate to the host-vehicle. Such object detection is desirable for detecting, for example, other vehicles in the so called blind spot which is not readily observable by an operator of a vehicle using typical side-view and rear-view mirrors. Such object detection may also be useful to warn the operator of a rapidly approaching vehicle in an adjacent lane if the operator indicates that a lane-change is about to be executed by, for example, activating a turn-signal indicator, or for detecting objects behind the host vehicle when backing-up. If the host vehicle is towing a trailer, reflections of radar signals by the trailer system may interfere with the detection of a target that does not correspond to or is not associated with the trailer. The accurate determination of the trailer-size is essential for distinguishing the trailer from other targets.

SUMMARY OF THE INVENTION

In accordance with one embodiment, a trailer-detection system configured to detect objects proximate to a vehicle is provided. The system includes a radar-sensor and a controller. The radar-sensor is used to determine a range, an azimuth-angle, and an elevation-angle of a radar-signal reflected by a trailer towed by a host-vehicle. The controller is configured to determine a size of the trailer towed by the host-vehicle based on the range, the azimuth-angle, and the elevation-angle of the radar-signal.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which:

FIG. 4 is an illustration of the various trailer-types that may be determined by a host-vehicle.

DETAILED DESCRIPTION

Figure 1:
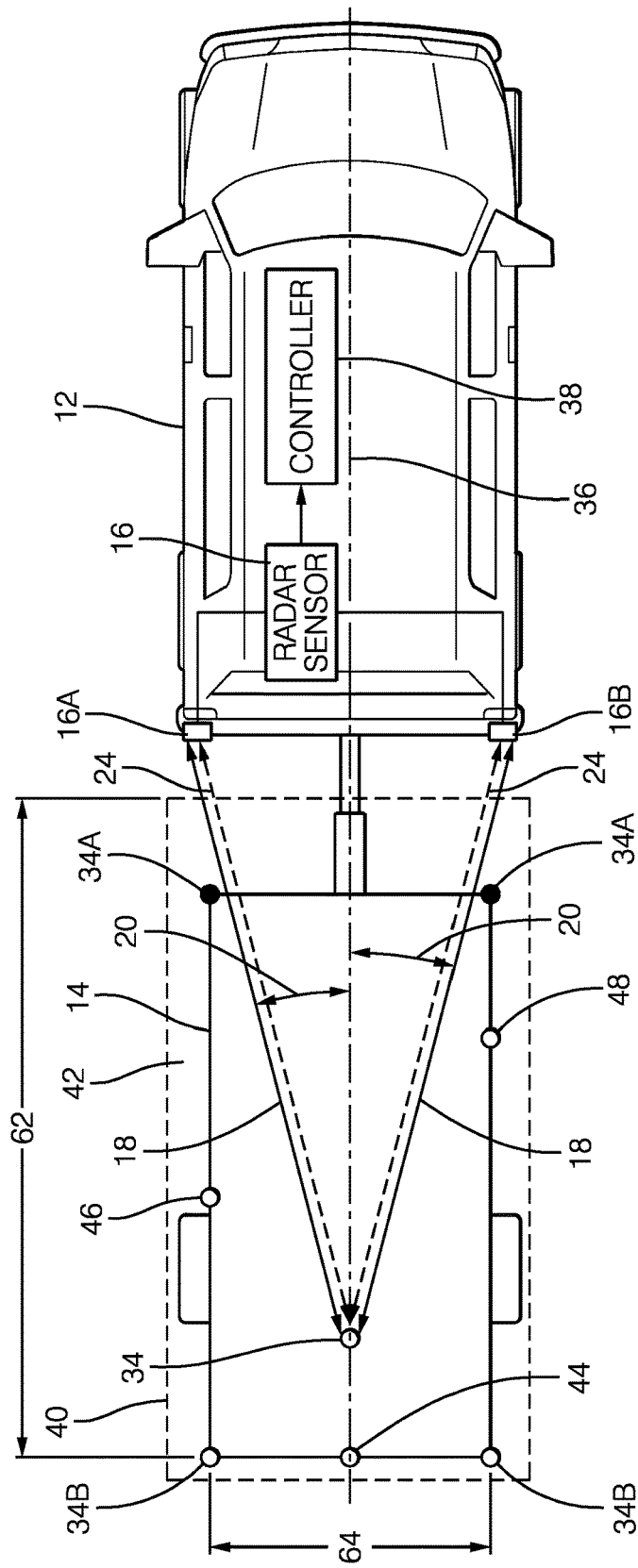
FIG. 1 is a top view of a host-vehicle equipped with a trailer-detection system and towing a trailer in accordance with one embodiment.
Figure 2:
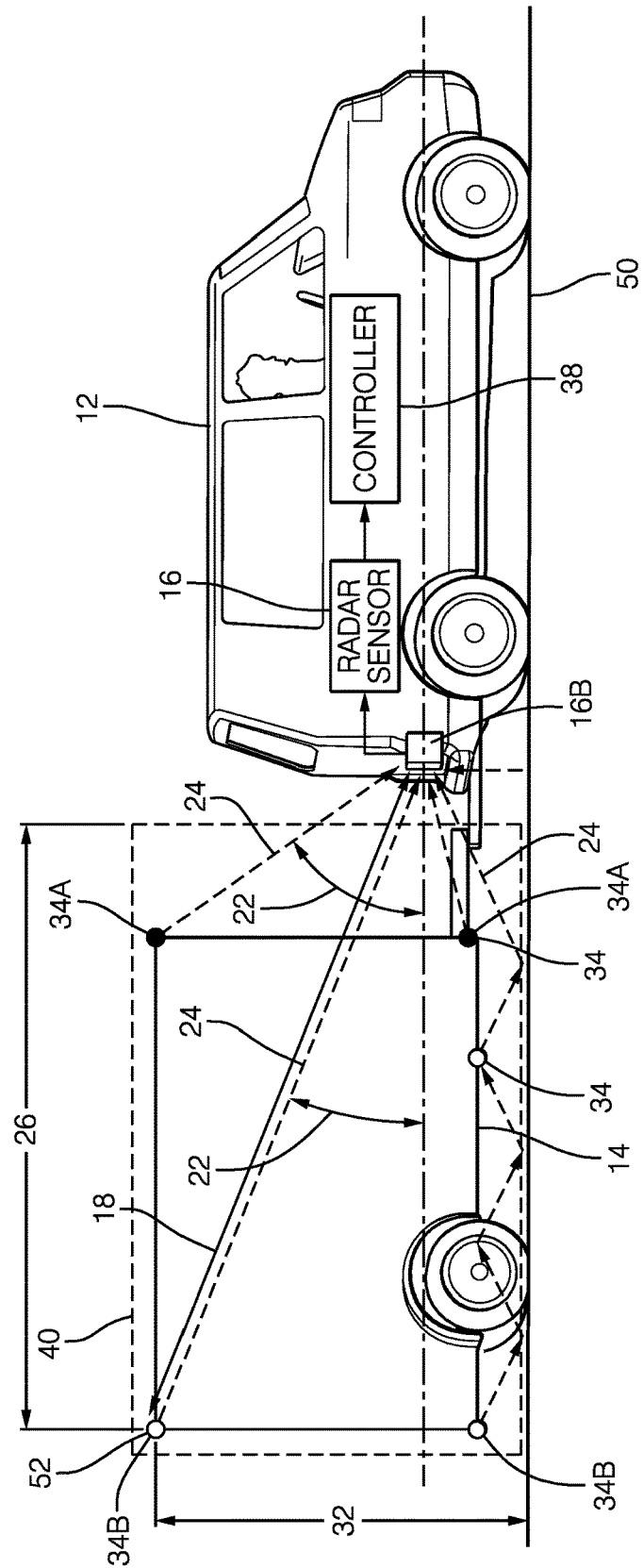
FIG. 2 is a side view of a host-vehicle equipped with a trailer-detection system and towing a trailer in accordance with one embodiment.

FIG. 1 illustrates a non-limiting example of a trailer-detection system 10, hereafter referred to as the system 10. The system 10 is generally configured to detect objects proximate to a host-vehicle 12 equipped with the system 10. As will be described in more detail below, the system 10 is an improvement over prior trailer-detection systems because the system 10 is configured to more accurately determine a size of a trailer 14 being towed by the host-vehicle 12 by using a radar-sensor 16 to determine a range 18, an azimuth-angle 20, and an elevation-angle 22 (FIG. 2) of a radar-signal 24 reflected by the trailer 14. This improvement enables the system 10 to more accurately determine a trailer-length 26, a trailer-width 28, and a trailer-type 30, by also determining a trailer-height 32 (FIG. 2).

The system 10 includes the radar-sensor 16 used to detect the radar-signal 24 that is reflected by the trailer 14 towed by the host-vehicle 12. In the non-limiting example illustrated in FIG. 1, the radar-sensor 16 includes a left-sensor 16A and a right-sensor 16B. It is contemplated that the teachings presented herein are applicable to radar-systems with one or more sensor devices, i.e. multiple instance of the radar-sensor 16. The radar-sensor 16 is generally configured to detect the radar-signal 24 that may include data indicative of a detected-target 34 present on the trailer 14. Data that corresponds to a strong-target 34A will generally be from consistent, non-intermittent signals. However, data that corresponds to a weak-target 34B may be intermittent or have some substantial variability due to a low signal-to-noise ratio.

Prior examples of radar-systems on vehicles are typically capable of only determining a distance or range 18 and azimuth-angle 20 to a target so may be referred to as a two-dimensional (2D) radar-system. As will become apparent in the descripting of the system 10 described herein, the radar-sensor 16 will need to be capable of being used to determine a range 18, an azimuth-angle 20, and an elevation-angle 22 to a target. That is, the system 10 described herein will need to be capable of three-dimensional (3D) target tracking. Various radar-sensor 16 configurations have been proposed for automotive applications to provide a way to determine elevation-angle 22 in addition to range 18 and azimuth-angle 20 and thereby provide for 3D tracking.

By way of example and not limitation, the radar-sensor 16 may be configured to output a continuous or periodic data stream that includes a variety of signal characteristics associated with each target detected. The signal characteristics may include or be indicative of, but are not limited to, the range 18 to the detected-target 34 from the host-vehicle 12, the azimuth-angle 20 to the detected-target 34 relative to a host-vehicle-longitudinal-axis 36, the elevation-angle 22 relative to the left-sensor 16A and/or the right-sensor 16B, an amplitude (not shown) of the radar-signal 24, and a relative-velocity (not shown) of closure relative to the detected-target 34. A target is generally detected because the radar-signal 24 from the detected-target 34 has sufficient signal strength to meet some predetermined threshold. That is, there may be targets that reflect the radar-signal 24, but the strength of the radar-signal 24 is insufficient to be characterized as one of the detected-targets 34.

The system 10 may include a controller 38 configured to receive the radar-signal 24 from the radar-sensor 16. The controller 38 may include a processor (not shown) such as a microprocessor or other control circuitry such as analog and/or digital control circuitry including an application specific integrated circuit (ASIC) for processing data as should be evident to those in the art. The controller 38 may include memory, including non-volatile memory, such as electrically erasable programmable read-only memory (EEPROM) for storing one or more routines, thresholds and captured data. The one or more routines may be executed by the processor to perform steps for determining if signals received by the controller 38 indicate the presence of objects as described herein. The controller 38 may also be configured to receive vehicle related data such as yaw-rate (not shown), vehicle speed (not shown), and transmission gear (not shown).

The controller 38 is generally configured to determine if the radar-signal 24 arising from the detected-target 34 corresponds to (i.e. is associated with) the trailer 14 being towed by the host-vehicle 12. That is, the controller 38 determines if the trailer 14 is present, so is actually being towed by the host-vehicle 12. The controller 38 is also generally configured to define a three-dimensional (3D) trailer-boundary 40 characterized as occupied by the trailer 14 and thereby excluded from the zone proximate to the host-vehicle 12 where objects can be detected. By defining the portion of the zone proximate to the host-vehicle 12 that is the trailer-boundary 40, the controller 38 can more readily determine if what seems to be a new target indicated by the radar-signal 24 is likely from the trailer 14, or is likely from something other than the trailer 14, such as the other-vehicle (not shown).

The radar-signal 24 may be analyzed by the controller 38 to categorize the data from each detected-target 34 with respect to a list of previously detected-targets 34 having established tracks. As used herein, a track refers to one or more data sets that have been associated with a particular one of the detected-targets 34. By way of example and not limitation, if the amplitude of the radar-signal 24 is greater than a predetermined amplitude threshold, then the controller 38 determines if the data corresponds to a previously detected-target 34 or if a new-target has been detected. If the data corresponds to a previously detected-target 34, the data is added to or combined with prior data to update the track of the previously detected-target 34. If the data does not correspond to any previously detected-target 34 because, for example, it is located too far away from any previously detected-target 34, then it may be characterized as a new-target and assigned a unique track identification number. The identification number may be assigned according to the order that data for a new detected-target 34 is received, or may be assigned an identification number according to a grid location in the zone proximate to the host-vehicle 12.

The expectation is that a detected-target 34 or a track that corresponds to (i.e. is associated with) the trailer 14 would have a relative-velocity near zero, and that this condition would persist for an extended period of time. That is, the detected-target 34 corresponds to the trailer 14 if the range 18 to the detected-target 34 varies less than a variation threshold (e.g. less than 0.25 meters/Sec) for greater than a time threshold (e.g. greater than 5 seconds). It is noted that characterizing a target as having a relative-velocity near zero and having a variation in range 18 less than a variation threshold are effectively the same characterization. As such, references to the term 'range-rate' in the discussion that follows are directly comparable to the terms 'relative-velocity', 'relative-rate' and 'variation-in-range'.

Figure 3:
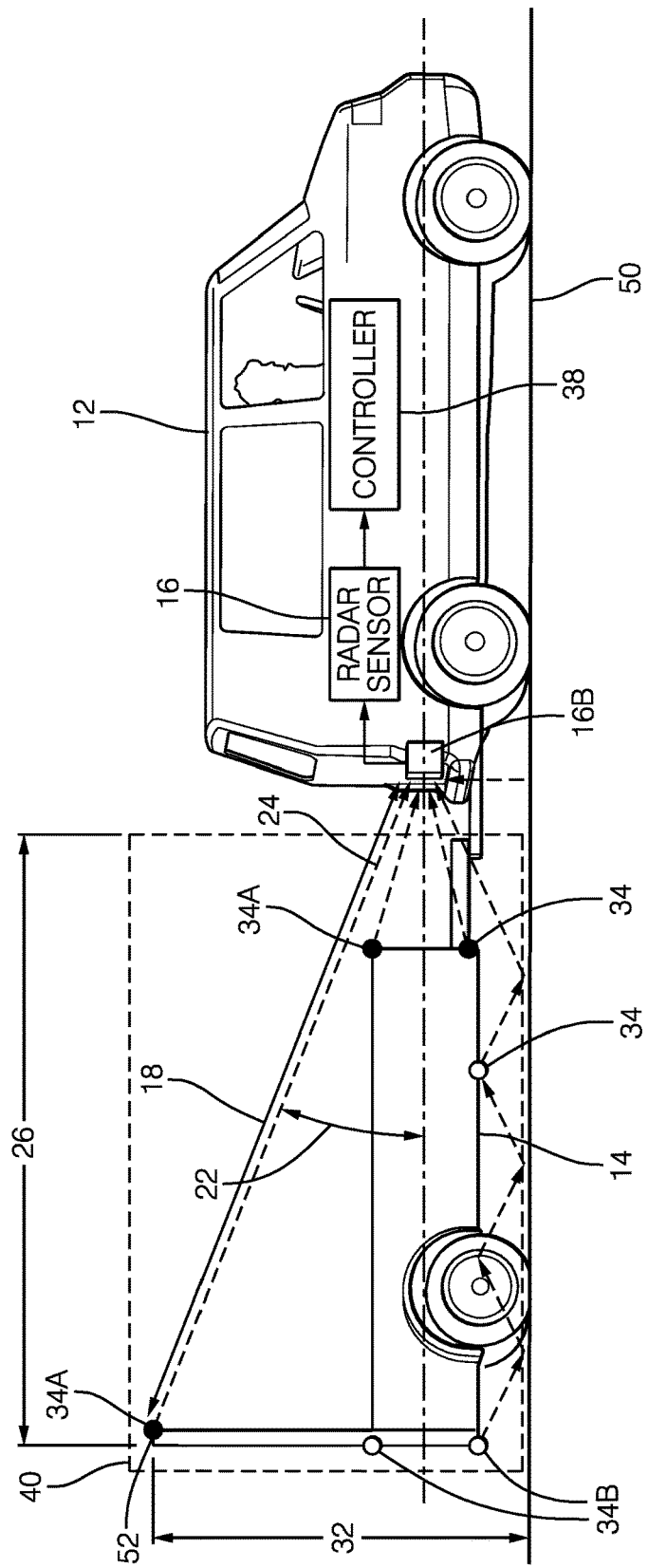
FIG. 3 is a side view of a host-vehicle equipped with a trailer-detection system and towing a trailer in accordance with one embodiment.

FIGS. 2 and 3 are a right-side view of the system 10 of FIG. 1 and illustrate the elevation-angle 22 of the radar-signal 24 detected by the radar-sensor 16 from two different trailer-types 30. When the trailer 14 is being towed, there will generally be some consistent reflected signals created from strong-targets 34A such as the front of the trailer or other highly reflective objects such as wheel wells or fenders of the trailer; and some intermittent reflected signals from weak-targets 34B such as the back bumper of the trailer 14 or other-vehicles (not shown) such as a motorcycle for example. Reflected signals from the weak-targets 34B may be, for example, a multi-path reflection from under the trailer 14 as the radar-signal 24 bounces between the trailer 14 and the ground, or by multi-path reflections traveling through a grated open trailer 14 or cross-frame members of the frame of the trailer 14.

The controller 38 is in communication with the radar-sensor 16 and may be configured to determine the size of the trailer 14 towed by the host-vehicle 12 based on the range 18, the azimuth-angle 20, and the elevation-angle 22 to a target indicated by the radar-signal 24. The size of the trailer 14 may be defined by the trailer-length 26, the trailer-width 28, and the trailer-height 32 and may represent a 3D volume of the trailer 14. The trailer-area 42 is defined by the trailer-length 26 and the trailer-width 28 and may represent a 2D area of the trailer 14. Advantageously, the determination of the trailer-area 42 using the radar-signal 24 may include using the zero range-rate (ZRR) tracks to determine the trailer-length 26, the trailer-width 28 (FIG. 1), and the trailer-height 32 (FIG. 2). While the trailer-height 32 dimension is not entered into the calculation of the trailer-area 42 by the controller 38, it may be used to exclude detected-targets 34 that are outside of the 3D volume of the trailer 14. This exclusion improves the measurement of the trailer-area 42, as any detected-targets 34 outside of the 3D volume of the trailer 14 would otherwise be considered part of the trailer 14 when using a 2D-radar-sensor. This is due to the nature of the 2D-radar-sensor's inability to interpret the 3D radar-signal's 24 elevation-angle 22, resulting in an enlarged area as will be understood by one skilled in the art of radar interpretation. In addition, multi-bounce signals that corrupt the trailer-size estimation may be eliminated. In other words, if a radar-signal 24 contains data indicating that a highest-target 52 is above the maximum-height of the trailer 14 (4.3 meters for example), the controller 38 may omit this data from the calculation of the trailer-height 32.

Given the track data described above, each track is compared to a defined bounded area behind the host-vehicle 12 and only tracks that are within those bounds are used. The boundary is set by calibrations and the current boundary is 2.4 meters wide, 16.2 meters long, and 4.3 meters high. Additional constraints such as minimum amplitudes or detections sources may be applied to qualify a track prior to using it to determine the trailer-length 26 and the trailer-width 28. After the final track set is determined, the trailer-length 26, the trailer-width 28, and the trailer-height 32 are determined in two steps: Determine the unfiltered (raw) value, and Filter the raw value to the final value. The unfiltered trailer-length 26 is determined by taking the maximum longitudinal-distance back from the host-vehicle's 12 rear bumper, and the raw trailer-width 28 is determined by taking the maximum lateral-distance between any two points within the bounded area. Similarly, the unfiltered trailer-height 32 is determined by taking the maximum vertical-distance between the road-surface 50 and any point within the bounded area. The unfiltered measures are then filtered. One way of filtering is to use a low pass filter with a long time constant such as five seconds. The second way of filtering is to create a histogram of the unfiltered measures where one count is added to the bin that corresponds to the current unfiltered measure and then the bin with the highest counts is selected as the filtered measure. The histogram filter approach appears to create a more stable estimation than the low pass filtered measure. By executing the processes described above, the trailer-length 26 of the trailer-boundary 40 can be determined by the controller 38 based on the longitudinal-distance to a most-distant-target 44 (FIG. 1) that corresponds to the trailer 14 and is closer to the host-vehicle 12 than a maximum trailer-length (16.2 meters); the trailer-width 28 of the trailer-boundary 40 can be determined based on the lateral-distance between a left-most-target 46 that corresponds to the trailer 14, and a right-most-target 48 that corresponds to the trailer 14 (FIG. 1); and the trailer-height 32 of the trailer-boundary 40 can be determined based on the vertical-distance between the road-surface 50 and the highest-target 52 (FIG. 2).

The controller 38 may also be configured to determine the trailer-type 30 (FIG. 4) based on the radar-signal 24. Advantageously, if the trailer-type 30 can be determined, the controller 38 is able to better identify the front of the trailer 14 and the rear of the trailer 14 for improved pattern-matching of the tracks. As described previously, strong-targets 34A will generally be from consistent, non-intermittent signals such as from the front of the trailer 14 and from a high tail-gate of the trailer 14, will create primary radar detections that are characterized as the strongest and most consistent detections. By combining the range 18, the azimuth-angle 20, and the elevation-angle 22 of the primary radar detections in a 3D space, a 2D trailer-profile or 3D surface representation of the front of the trailer 14 may be constructed by the controller 38. The trailer-profile may be generalized to identify a flat-surface representing an enclosed-trailer 30A, a staggered-surface indicating a low front and high back representing a utility-trailer 30B, and a scattered-surface representing a trailer 14 carrying cargo (utility-trailer-loaded 30C) with part of the tailgate reflecting the radar-signal 24. The trailer-profile may also be matched against pre-defined trailer-profiles to identify the trailer-type 30. A large curved surface may represent a travel-trailer 30D or a low tightly curved surface may represent a popup-camper (not shown), for example.

Accordingly, a trailer-detection system 10 (the system 10) and a controller 38 for the system 10 is provided. The teachings presented herein advantageously improve the determination of trailer-size over prior trailer-detection systems.

While this invention has been described in terms of the preferred embodiments thereof, it is not intended to be so limited, but rather only to the extent set forth in the claims that follow.

We claim:

1. A trailer-detection system configured to determine a size of a trailer towed by a host-vehicle, said system comprising:
    a radar-sensor used to determine a range, an azimuth-angle, and an elevation-angle of a radar-signal reflected by targets associated with a trailer towed by a host-vehicle; and
    a controller in communication with the radar-sensor, said controller configured to determine a size of the trailer towed by the host-vehicle based on the range, the azimuth-angle, and the elevation-angle of the radar-signal;
        the controller further configured to determine a trailer-type based on the radar-signal; wherein
            the trailer-type includes an enclosed-trailer, a utility-trailer, a utility-trailer-loaded, and a travel-trailer;
            the controller further configured to define a three-dimensional trailer-boundary characterized as occupied by the trailer and thereby exclude the trailer from the zone proximate to the host-vehicle where objects are detected.

2. The system in accordance with claim 1, wherein the controller is further configured to determine a trailer-height based on the radar-signal.

3. The system in accordance with claim 1, wherein the controller is further configured to determine a trailer-length based on the radar-signal.

4. The system in accordance with claim 1, wherein the controller is further configured to determine a trailer-width based on the radar-signal.

5. The system in accordance with claim 1, wherein the radar-sensor comprises a left-sensor and a right-sensor.

6. The system in accordance with claim 5, wherein the left-sensor and the right-sensor are mounted to rear corners of the host-vehicle.

7. The system in accordance with claim 1, wherein the radar-sensor comprises three dimensional radar-sensor.

8. The system in accordance with claim 1, wherein the controller excludes radar-signals indicating that a highest-target associated with the trailer is above a maximum-height of the trailer.

9. The system in accordance with claim 8, wherein the maximum-height of the trailer is about 4.3 meters.

10. A trailer-detection method configured to determine a size of a trailer towed by a host-vehicle, said method comprising:
    determining, with a radar-sensor, a range, an azimuth-angle, and an elevation-angle of a radar-signal reflected by targets associated with a trailer towed by a host-vehicle; and
    determining, with a controller in communication with the radar-sensor, a size of the trailer towed by the host-vehicle based on the range, the azimuth-angle, and the elevation-angle of the radar-signal;
    determining, with the controller, a trailer-type based on the radar-signal; wherein
        the trailer-type includes an enclosed-trailer, a utility-trailer, a utility-trailer-loaded, and a travel-trailer;
    defining, with the controller, a three-dimensional trailer-boundary characterized as occupied by the trailer; and
    excluding, with the controller, the trailer from a zone proximate to the host-vehicle where objects are detected.

11. The method in accordance with claim 10, wherein the controller is further configured to determine a trailer-height based on the radar-signal.

12. The method in accordance with claim 10, wherein the controller is further configured to determine a trailer-length based on the radar-signal.

13. The method in accordance with claim 10, wherein the controller is further configured to determine a trailer-width based on the radar-signal.

14. The method in accordance with claim 10, wherein the radar-sensor comprises a left-sensor and a right-sensor.

15. The method in accordance with claim 14, wherein the left-sensor and the right-sensor are mounted to rear corners of the host-vehicle.

16. The method in accordance with claim 10, wherein the radar-sensor comprises three dimensional radar-sensor.

17. The method in accordance with claim 10, wherein the controller excludes radar-signals indicating that a highest-target associated with the trailer is above a maximum-height of the trailer.

18. The method in accordance with claim 17, wherein the maximum-height of the trailer is about 4.3 meters.

19. A controller comprising:
    one or more computer processors;

one or more non-transitory storage media storing instructions which, when executed by the one or more computer processors, cause performance of operations comprising:

determining, with a radar-sensor, a range, an azimuth-angle, and an elevation-angle of a radar-signal reflected by targets associated with a trailer towed by a host-vehicle; and determining, with a controller in communication with the radar-sensor, a size of the trailer towed by the host-vehicle based on the range, the azimuth-angle, and the elevation-angle of the radar-signal;

determining, with the controller, a trailer-type based on the radar-signal; wherein the trailer-type includes an enclosed-trailer, a utility-trailer, a utility-trailer-loaded, and a travel-trailer;

defining, with the controller, a three-dimensional trailer-boundary characterized as occupied by the trailer; and excluding, with the controller, the trailer from a zone proximate to the host-vehicle where objects are detected.

\* \* \* \* \*